United States Patent
Hoshi et al.

(10) Patent No.: US 9,073,456 B2
(45) Date of Patent: Jul. 7, 2015

(54) VEHICLE SEAT

(75) Inventors: Masayuki Hoshi, Tochigi (JP); Masaya Furuta, Tochigi (JP); Mitsunobu Nishioka, Aichi (JP); Takuto Esaki, Aichi (JP)

(73) Assignees: TS TECH CO., LTD., Saitama (JP); IMASEN ELECTRIC INDUSTRIAL CO., LTD., Aichi (JP)

( * ) Notice: Subject to any disclaimer, the term of this patent is extended or adjusted under 35 U.S.C. 154(b) by 21 days.

(21) Appl. No.: 13/877,877

(22) PCT Filed: Apr. 1, 2011

(86) PCT No.: PCT/JP2011/058424
§ 371 (c)(1),
(2), (4) Date: Apr. 4, 2013

(87) PCT Pub. No.: WO2012/049871
PCT Pub. Date: Apr. 19, 2012

(65) Prior Publication Data
US 2013/0214576 A1    Aug. 22, 2013

(30) Foreign Application Priority Data

Oct. 12, 2010 (JP) ............... PCT/JP2010/067855
Oct. 12, 2010 (JP) ............... PCT/JP2010/067856

(51) Int. Cl.
*A47C 1/00* (2006.01)
*B60N 2/16* (2006.01)

(52) U.S. Cl.
CPC ............... *B60N 2/16* (2013.01); *B60N 2/1615* (2013.01); *B60N 2/165* (2013.01); *B60N 2205/50* (2013.01)

(58) Field of Classification Search
USPC ............... 297/321, 311, 338, 344.12, 344.1, 297/344.15; 248/421
See application file for complete search history.

(56) References Cited

U.S. PATENT DOCUMENTS 4,556,185 A    12/1985  Takagi
4,973,105 A *  11/1990  Itou ........................ 297/344.12
(Continued)

FOREIGN PATENT DOCUMENTS

DE    10 2008 038 848    5/2009
JP    S58-139234 U       9/1983
(Continued)

OTHER PUBLICATIONS

Office Action issued on Feb. 27, 2015 in counterpart Chinese patent application.

*Primary Examiner* — Jose V Chen
(74) *Attorney, Agent, or Firm* — Hamre, Schumann, Mueller & Larson, P.C.

(57) ABSTRACT

A vehicle seat with a height adjustable seat bottom, comprises side frames (30) which constitute the seat bottom, front links (5) and rear links (6) pivotally connected to the side frames (30), slide rails (4) disposed under the side frames (30) to form a four-bar linkage with the side frames (30), the front links (5) and the rear links (6), and an operation unit (7) including an operation knob (71 B) configured to be operated to make a rotational motion which actuates the four-bar linkage for adjustment of a height of the seat bottom. The operation unit (7) includes a pinion gear (73) configured to be rotatable coaxially with the operation knob (71B) provided at one of the pair of side frames (30), and the front links (5) include a sector gear portion (51) configured to engage with the pinion gear (73), such that rotation of the pinion gear (73) causes the front links (5) to pivot.

4 Claims, 5 Drawing Sheets

(56) References Cited

U.S. PATENT DOCUMENTS

| | | | |
|---|---|---|---|
| 5,775,661 A * | 7/1998 | Matsumoto et al. | 248/421 |
| 6,488,337 B1 * | 12/2002 | De Voss et al. | 297/344.13 |
| 7,240,965 B2 * | 7/2007 | Messerschmidt et al. | 297/344.15 |
| 7,316,454 B2 * | 1/2008 | Yoshida | 297/344.14 |
| 7,717,509 B2 * | 5/2010 | Kojima | 297/216.2 |
| 7,766,427 B2 * | 8/2010 | Kojima et al. | 297/344.15 |
| 7,770,863 B2 * | 8/2010 | Yamada et al. | 248/429 |
| 7,828,384 B2 * | 11/2010 | Shinozaki | 297/344.15 |
| 7,984,950 B2 * | 7/2011 | Hoshi et al. | 297/344.12 |
| 8,353,561 B2 * | 1/2013 | Yamazaki et al. | 297/452.38 |
| 8,585,148 B2 * | 11/2013 | Yamada et al. | 297/344.15 |
| 2003/0218369 A1 * | 11/2003 | Akaike et al. | 297/344.15 |
| 2007/0194613 A1 * | 8/2007 | Kojima | 297/344.15 |
| 2007/0216210 A1 * | 9/2007 | Kim et al. | 297/344.15 |
| 2008/0007104 A1 * | 1/2008 | Yokota | 297/344.15 |
| 2010/0001569 A1 * | 1/2010 | Shinozaki | 297/344.15 |
| 2011/0163585 A1 * | 7/2011 | Beneker et al. | 297/344.15 |
| 2012/0139306 A1 * | 6/2012 | Jeong et al. | 297/216.1 |
| 2013/0161989 A1 * | 6/2013 | Ito | 297/313 |

FOREIGN PATENT DOCUMENTS

| | | |
|---|---|---|
| JP | 2-90149 | 7/1990 |
| JP | 2006-199049 | 8/2006 |
| JP | 2007-308050 | 11/2007 |
| JP | 2008-265365 | 11/2008 |
| JP | 2010-960 | 1/2010 |

* cited by examiner

VEHICLE SEAT

TECHNICAL FIELD

The present invention relates to a vehicle seat with a height-adjustable seat bottom.

BACKGROUND ART

A vehicle seat, such as a car seat, with a height-adjustable seat bottom is hitherto known in the art. In Patent Literature 1, a car seat is disclosed in which a side frame, a slide rail fixed to a floor of a vehicle body, and front and rear links pivotally connected to the side frame and the slide rail are arranged to form a four-bar linkage so that a height of a seat bottom can be adjusted by operating/turning an operation knob provided at one side frame.

To be more specific, in the car seat of Patent Literature 1, when the operation knob is turned, a pinion gear mounted on a rotary shaft of the operation knob rotates, causing a sector gear disposed between the side frame and the front link to rotate. Then, as the sector gear rotates, a pin provided at the sector gear causes the front link to swing in a raise-up direction or in a tilt-down direction, and at the same time, causes the rear link to swing in a raise-up direction or in a tilt-down direction via a link rod, whereby the height of the side frame is rendered adjustable.

CITATION LIST

Patent Literature

Patent Literature 1: JP 2007-308050 A

SUMMARY OF INVENTION

Technical Problem

A conventional height-adjustment mechanism comprises a link rod which connects the front and rear links, a sector gear disposed between the side frame and the front link, and the like; thus, the number of parts required is so large.

With this in view, it is one object of the present invention to reduce the number of parts in a vehicle seat with a height-adjustable seat bottom.

Solution to Problem

According to the present invention for attaining the aforementioned object, a vehicle seat with a height-adjustable seat bottom comprises a pair of side frames which constitutes left and right frames of the seat bottom, left and right rear links pivotally connected to rear portions of the side frames, respectively, left and right front links disposed frontwardly of the rear links and pivotally connected to the side frames, respectively, a link support member disposed under the side frames and configured to support the rear links and the front links in a manner that renders the links pivotable, thereby forming a four-bar linkage with the side frames, the rear links and the front links, and an operation unit including an operation member configured to be operated to make a rotational motion which actuates the four-bar linkage for adjustment of a height of the seat bottom, wherein the operation unit includes an output gear configured to be rotatable coaxially with the operation member provided at one of the pair of side frames, and wherein the front links include an input gear configured to engage with the output gear, such that rotation of the output gear causes the front links to pivot.

With this configuration, in which the front links include the input gear configured to engage with the output gear of the operation unit such that the rotation of the output gear causes the front links to pivot, in other words, the front links are provided with a gear for actuating the four-bar linkage, and thus a sector gear as a discrete part can be omitted, so that the number of parts can be reduced. Moreover, since the rotational motion of the operation member directly causes the front links to pivot in a raise-up direction or in a tilt-down direction which actuates the four-bar linkage to thereby achieve adjustments of the height of the seat bottom, a link rod connecting the front and rear links can be omitted, so that the number of parts can be reduced. As the number of parts can be reduced as described above, the costs (costs of parts and labor during assembly) and the weight of the seat can be reduced in comparison with the conventional seat.

The above-described vehicle seat may be further configured such that each of the left and right front links includes the input gear, wherein the operation unit includes a pair of left and right output gears each configured to engage with the input gear, and a connecting member elongated in a lateral direction and configured to connect the pair of output gears to render the output gears rotatable together.

With this configuration, since the rotational motion of the operation member directly causes the left and right front links to pivot simultaneously in a raise-up direction or in a tilt-down direction, an adjustment to the height of the seat bottom can be made in a stable manner. Moreover, after adjustment of the height of the seat bottom has been accomplished, the pivoting motion of the left and right front links is restricted by the engagement of the output gear and the input gear, and the left and right side frames 30 are supported by the respective front links at both of the left and right sides, so that the position in the height of the seat bottom can be stabilized.

The above-described embodiments may be further configured such that the side frames include link support walls configured to support the front links in a manner that renders the front links pivotable, and a gear support wall provided in a position shifted laterally from the link support walls and configured to support the output gear in a manner that renders the output gear rotatable, wherein a region in which the output gear and the input gear engage with each other is located adjacent to the gear support wall and covered with the gear support wall when viewed from a lateral direction.

With this configuration, since the region in which the output gear and the input gear engage with each other is located adjacent to the gear support wall and covered with the gear support wall when viewed in the lateral direction, the gears can be prevented from getting disengaged. Moreover, since the gear support wall is provided in the side frames, the need for providing another member for preventing the gears from getting disengaged can be obviated, so that the number of parts can be reduced.

Advantageous Effects of Invention

According to the present invention, since the front links include the input gear configured to engage with the output gear of the operation unit such that the rotation of the output gear causes the front links to pivot, the number of parts can be reduced. Accordingly, the costs and the weight of the seat can be reduced in comparison with the conventional seat.

Furthermore, according to the present invention, if the operation unit is configured to include a pair of output gears each configured to engage the input gear of each of the left and right front links, and a connecting member configured to connect the pair of output gears to render the output gears rotatable together, an adjustment to the height of the seat bottom can be made in a stable manner, and the position in the height of the seat bottom can be stabilized.

Furthermore, according to the present invention, if the region in which the output gear and the input gear engage with each other is located adjacent to the gear support wall provided in the side frame and covered with the gear support wall when viewed from the lateral direction, the gears can be prevented from getting disengaged, and the number of parts can be reduced.

DESCRIPTION OF EMBODIMENTS

Hereafter, a detailed description will be given of one embodiment of the present invention with reference made to the drawings where appropriate. It is to be understood that the front/rear, left/right (lateral) and upper/lower (upward/downward) used in describing the present invention are defined as viewed from an occupant sitting on the seat.

Figure 1:
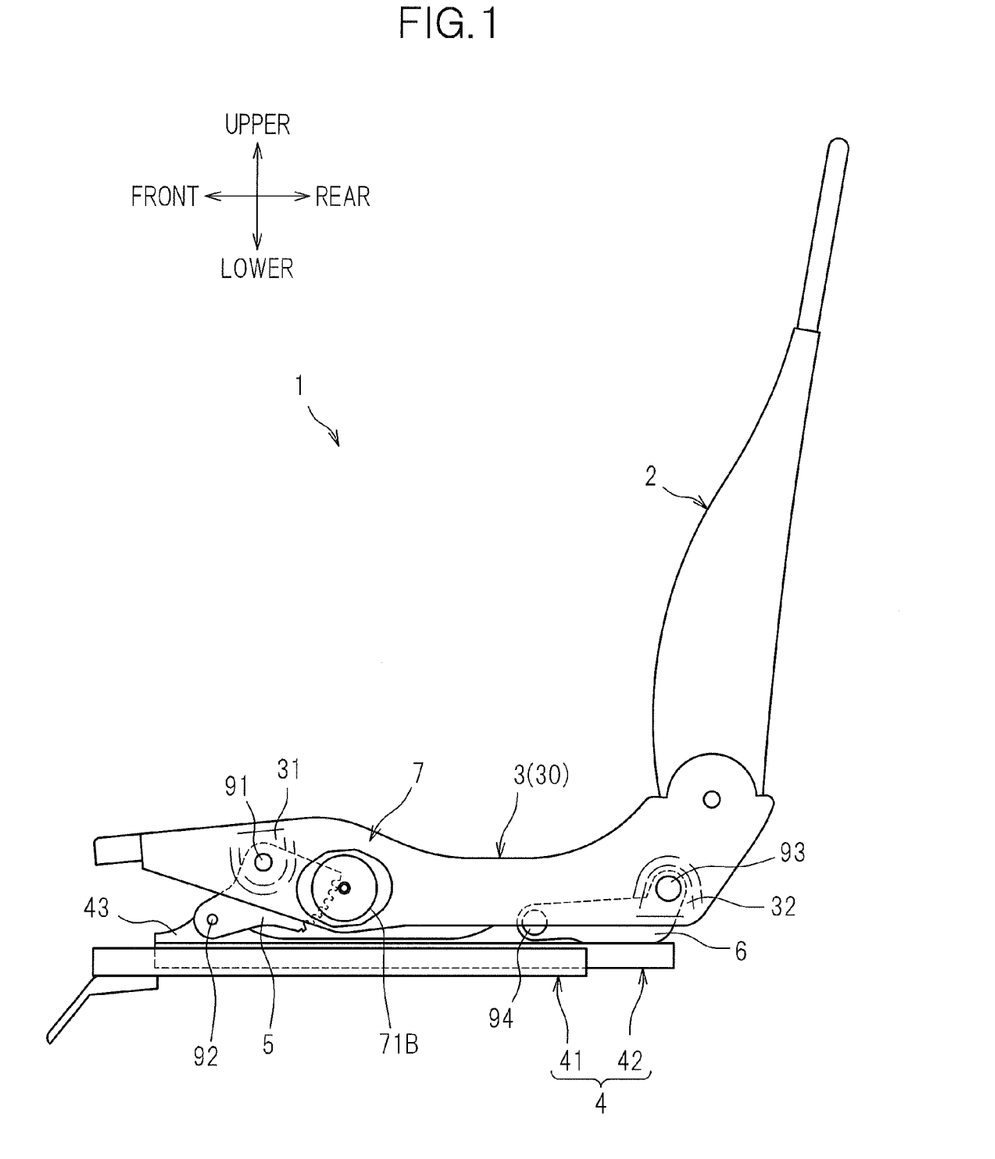
FIG. 1 is a side elevation of a vehicle seat according to one embodiment of the present invention.

As shown in FIG. 1, a car seat 1 as an example of a vehicle seat is configured such that a height of a seat bottom for an occupant to sit thereon is adjustable, and mainly includes a seat back frame 2, a seat bottom frame 3 which constitutes a frame of the seat bottom, a slide rail 4 as an example of a link support member, a front link 5, a rear link 6, and an operation unit 7.

This car seat 1 is provided with a seat cushion (not shown) made of urethane foam or the like, with which the outsides of the seat back frame 2 and the seat bottom frame 3 are covered.

The seat bottom frame 3 includes a pair of substantially sheet-like side frames 30 (only one of which is illustrated) which constitute left and right frames of the seat bottom. Each side frame 30 is made by sheet metal presswork or the like, and includes a front link support wall 31, a rear link support wall 32, and a gear support wall 33 (see FIGS. 2, 3).

The front link support wall 31 is a bottom wall of an inwardly recessed portion provided in a front portion (disposed frontwardly of the rear link 6) of each side frame 30 (see FIG. 2), and configured to support the front link 5 via a pin 91 in a manner that renders the front link 5 pivotable.

The rear link support wall 32 is a bottom wall of an inwardly recessed portion provided in a rear portion of each side frame 30, and configured to support the rear link 6 via a pin 93 in a manner that renders the rear link 6 pivotable. Since each side frame 30 includes recessed portions, the side frame 30 has an uneven shape as a whole, so that the rigidity of the side frame 30 (seat bottom frame 3) can be enhanced.

Figure 2:
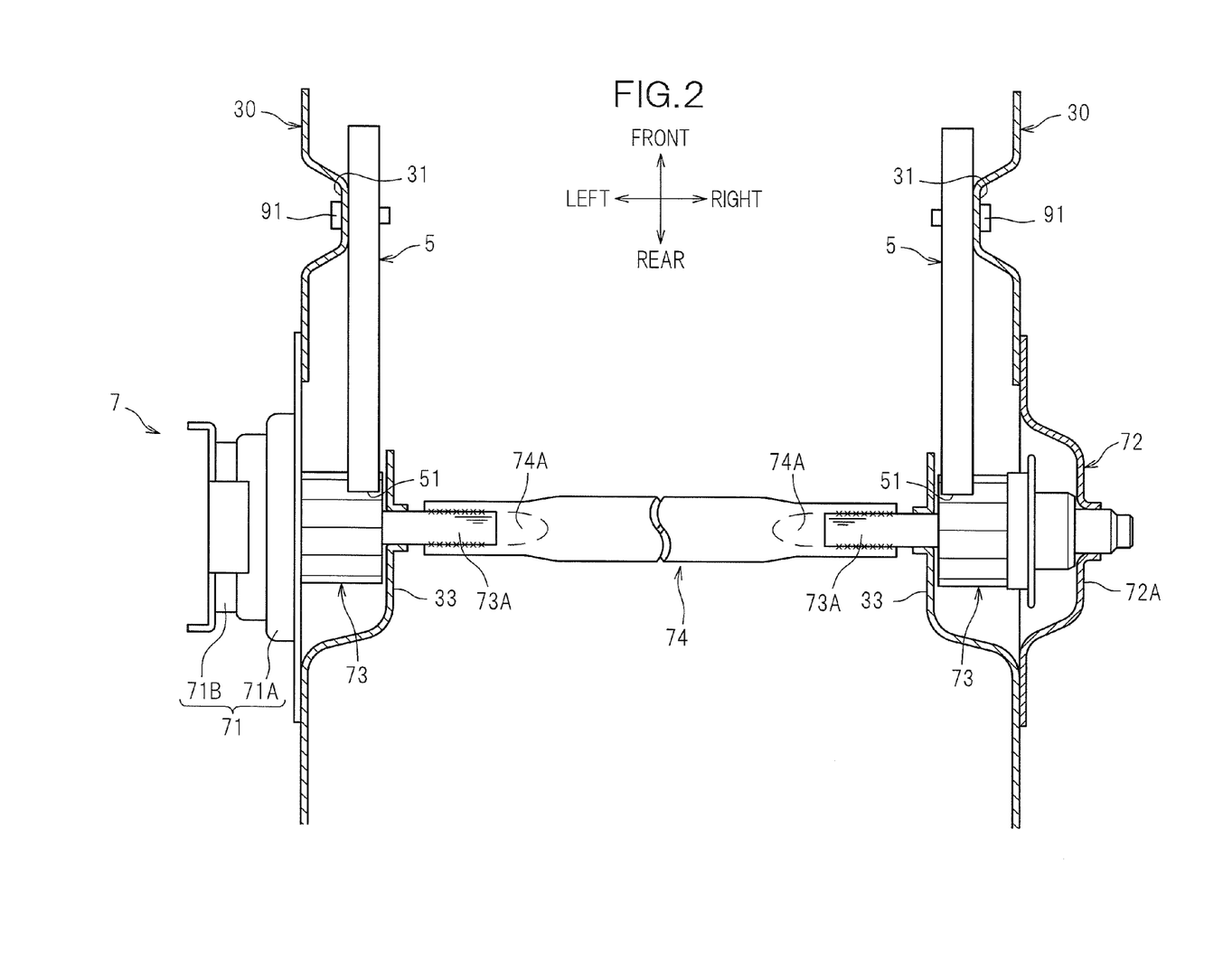
FIG. 2 is a diagram showing an operation unit and its surrounding structure.
Figure 3:
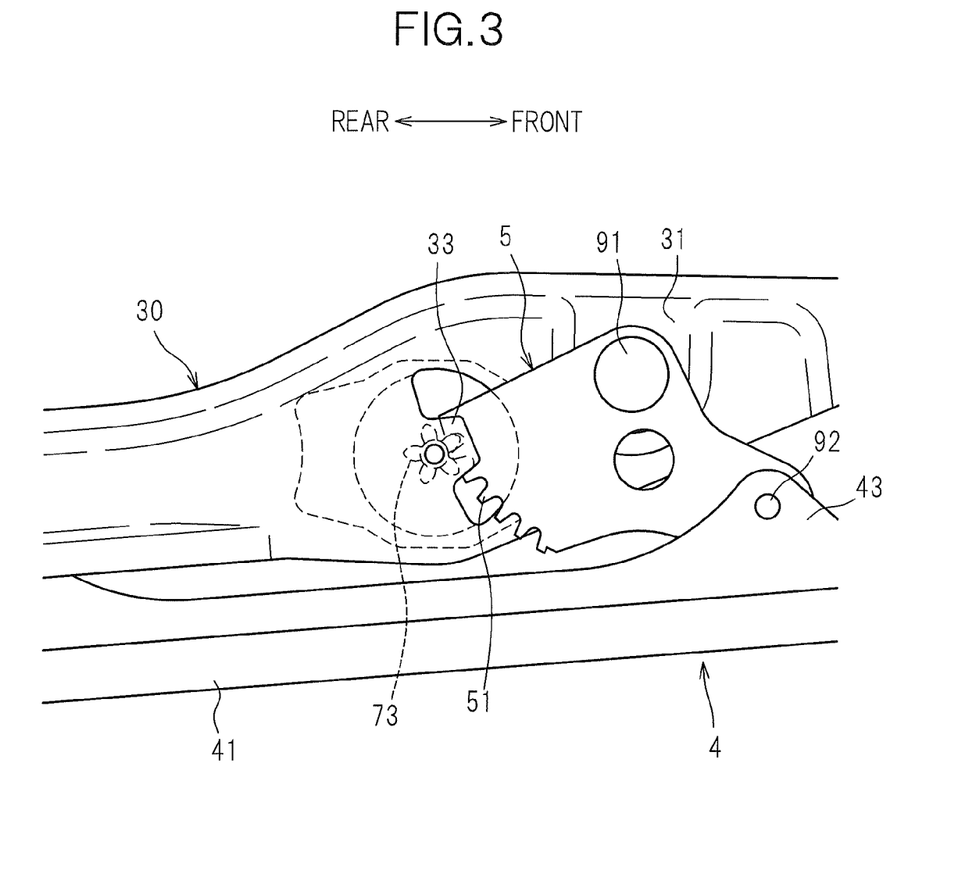
FIG. 3 is a diagram showing a portion of a side frame near a gear support wall as viewed from inside.

As shown in FIGS. 2, 3, the gear support wall 33 is a bottom wall of an inwardly recessed generally halved circular cup-like portion provided rearwardly of the front link support wall 31 in the front-rear direction. To be more specific, the gear support wall 33 is disposed in a position shifted laterally inwardly from the front link support wall 31 and positioned substantially parallel to the front link support wall 31.

This gear support wall 33 is configured to support a pinion gear 73 (output gear) located between the gear support wall 33 and an operation knob assembly 71 (mount portion 71A) which will be described later of the operation unit 7 or a bracket 72 in a manner that renders the pinion gear 73 rotatable (in a manner that permits it to turn around). The gear support wall 33 is shaped to have a central portion of a front side thereof protruding substantially frontward as viewed from a laterally inside so that the pinion gear 73 is covered and hidden therewith.

Turning back to FIG. 1, the slide rail 4 illustrated therein is configured to allow the seat bottom frame 3 (seat bottom) to be slid in the front-rear direction, and disposed under the side frames 30 (seat bottom frame 3). This slide rail 4 mainly includes a lower rail 41, an upper rail 42.

The lower rail 41 has a shape elongated in the front-rear direction, and is provided in two positions, at the left and at the right, spaced apart at a predetermined distance (only one of two lower rails is illustrated). Each lower rail 41 is fixed to the floor of the car (vehicle).

The upper rail 42 has a shape elongated in the front-rear direction, and engages with the lower rail 41 in such a manner that the upper rail 42 can slide in the front-rear direction. This upper rail 42 includes a link support portion 43 configured to support the front link 5 and the rear link 6 in a manner that renders the front and rear links pivotable. The upper rail 42 is connected via the front link 5 and the rear link 6 to the seat bottom frame 3; accordingly, the seat bottom can be slid in the front-rear direction relative to the floor of the car to which the lower rail 41 is fixed.

The front link 5 and the rear link 6 have upper ends pivotally connected to the side frame 30 and lower ends pivotally connected to the upper rail 42 (slide rail 4), respectively, to thereby form a four-bar linkage with the side frame 30 and the slide rail 4. With this configuration, the side frame 30 (seat bottom) can be moved upward and downward relative to the slide rail 4.

To be more specific, the front links 5 are provided, one at the left and one at the right (only one of two front links is illustrated), and an upper-end portion of each one is connected to the front part of the side frame 30 at an inside of the front link support wall 31 by a pin 91 to form a joint thereat. The pin 91 is applied to support the front link 5 in a manner that permits the front link 5 to pivot, and thus the front link 5 is rendered pivotable relative to the side frame 30.

A lower-end portion of the front link 5 is connected to the front part of the link support portion 43 of the upper rail 42 to form a joint thereat. The pin 92 is applied to support the front link 5 in a manner that permits the front link 5 to pivot, and thus the front link 5 is rendered pivotable relative to the slide rail 4.

As shown in FIG. 3, each of the left and right front links 5 (only one of which is illustrated) includes a sector gear portion 51 as an example of an input gear configured to engage with the pinion gear 73 of the operation unit 7, such that rotation of the pinion gear 73 causes the front link 5 to pivot. The sector gear portion 51 is disposed in a rear portion at an upper-end portion (pin 91) of each front link 5 along an arc of which a center of curvature coincides with the pin 91.

The left and right front links 5 may be connected by a laterally extending pipe-like member or the like.

As shown in FIG. 1, the rear links 6 are provided, one at the left and one at the right (only one of which is illustrated), and an upper-end portion of each one is connected to the rear part of the side frame 30 at an inside of the rear link support wall 32 by a pin 93 to form a joint thereat. The pin 93 is applied to support the rear link 6 in a manner that permits the rear link 6 to pivot, and thus the rear link 6 is rendered pivotable relative to the side frame 30.

A lower-end portion of the rear link 6 is connected to the rear part of the link support portion 43 of the upper rail 42 to form a joint thereat. The pin 94 is applied to support the rear link 6 in a manner that permits the rear link 6 to pivot, and thus the rear link 6 is rendered pivotable relative to the slide rail 4.

The left and right rear links 6 may also be connected by a laterally extending pipe-like member or the like.

Figure 4:
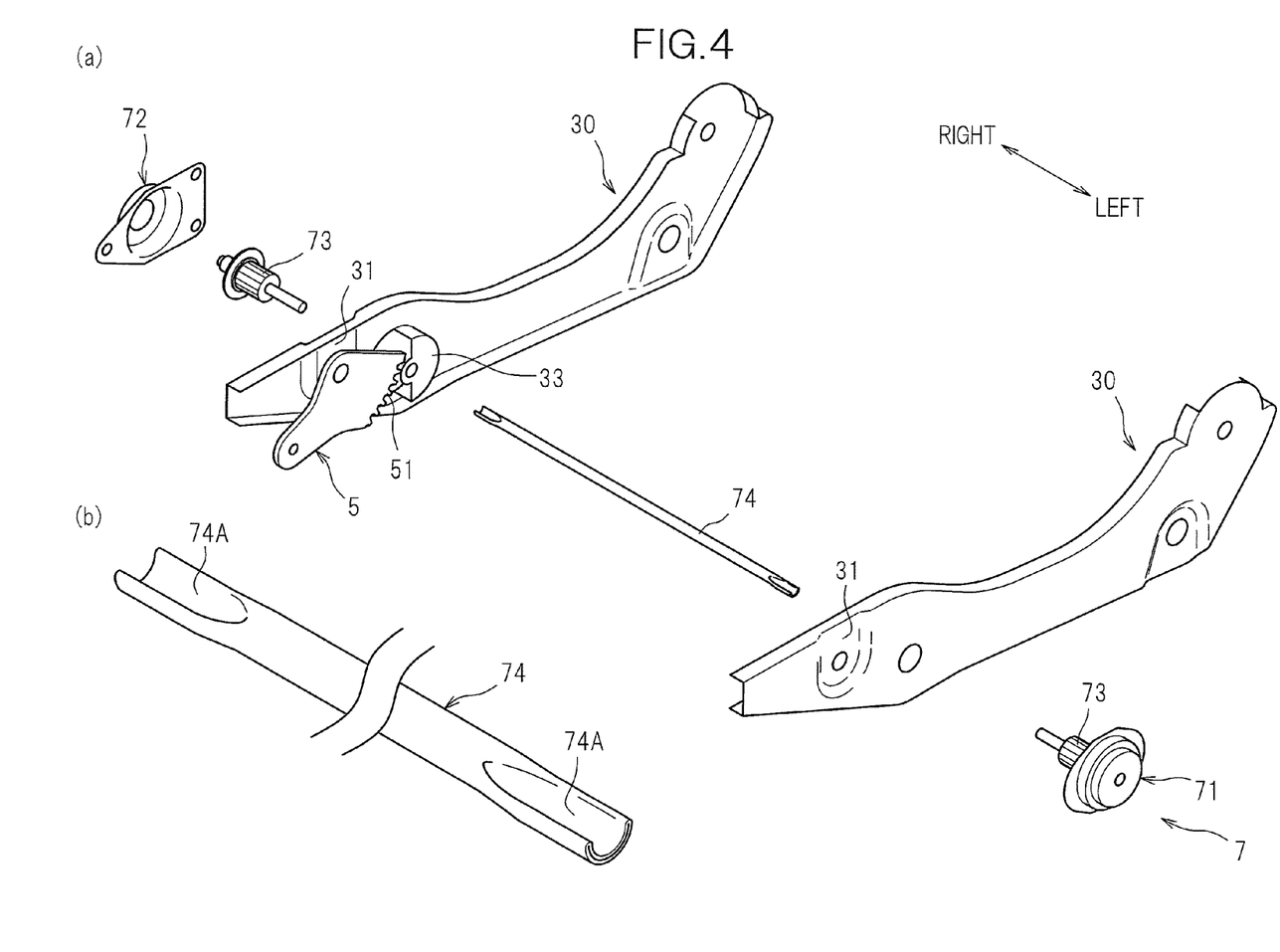
FIG. 4 includes (a) a perspective view of side frames, a front link, and an operation unit, and (b) an enlarged perspective view of a connecting member.

The operation unit 7 is a is a mechanism configured to actuate a four-bar linkage in response to the occupant's operation to adjust a height of the seat bottom, and as shown in FIGS. 2, 4 (*a*), mainly includes an operation knob assembly 71, a bracket 72, a pinion gear 73 as an example of an output gear, and a connecting member 74.

The operation knob assembly 71 is provided at a left side frame 30 that is one of the pair of side frames 30, and includes a mount portion 71A fixed to the side frame 30, and an operation knob 71B as an example of an operation member which is configured to be rotatable relative to the mount portion 71A.

The mount portion 71A is mounted, from outside, to a portion of the left side frame 30 in which the gear support wall 33 is formed, and configured to support, in collaboration with the gear support wall 33, the left pinion gear 73 in a manner that renders the left pinion gear 73 rotatable. A left end of the rotary shaft 73A of the left pinion gear 73 is fixed to the center of rotation of the operation knob 71B. Accordingly, as the operation knob 71B is rotated, the left pinion gear 73 is rotated integrally and coaxially with the operation knob 71B.

Although not illustrated in the drawings, the operation knob 71B is configured to rotate with a friction produced against the mount portion 71A (or the side frame 30) in a manner known in the art. In the present invention, the operation knob 71B may have any shape without limitation; for example, it may be shaped like a dial or like a lever.

The bracket 72 is a substantially cup-like member mounted, from outside, to a portion of the right side frame 30 in which the gear support wall 33 is formed, and has a bottom portion 72A configured to support, in collaboration with the gear support wall 33, the right pinion gear 73 in a manner that renders the right pinion gear 73 rotatable.

The pinion gears 73 are provided, one at the left and one at the right, and each engages with the sector gear portion 51 of the front link 5. As shown in FIGS. 2, 3, a region in which the pinion gear 73 and the sector gear portion 51 engage with each other is located adjacent to the gear support wall 33 which supports the pinion gear 73, and covered with the gear support wall 33 when viewed from the lateral direction. With this configuration, the pinion gear 73 and the sector gear portion 51 can be prevented from getting disengaged from each other.

The connecting member 74 is a pipe-like member elongated in the lateral direction, and configured to connect the rotary shafts 73A of the pair of pinion gears 73 which protrude inwardly from the gear support walls 33 to render the pair of pinion gears 73 rotatable together. As shown in FIGS. 2, 4 (*b*), in the both of left and right end portions of the connecting member 74, recessed portions 74A each having a substantially semicircular cross section engageable with the rotary shaft 73A of the pinion gear 73 are formed, and the rotary shaft 73 of the pinion gear 73 is engaged in, and welded to, this recessed portion 74A so that the pinion gear 73 is fixed to the connecting member 74.

A height-adjustment operation in the car seat 1 configured as described above will be described.

Figure 5:
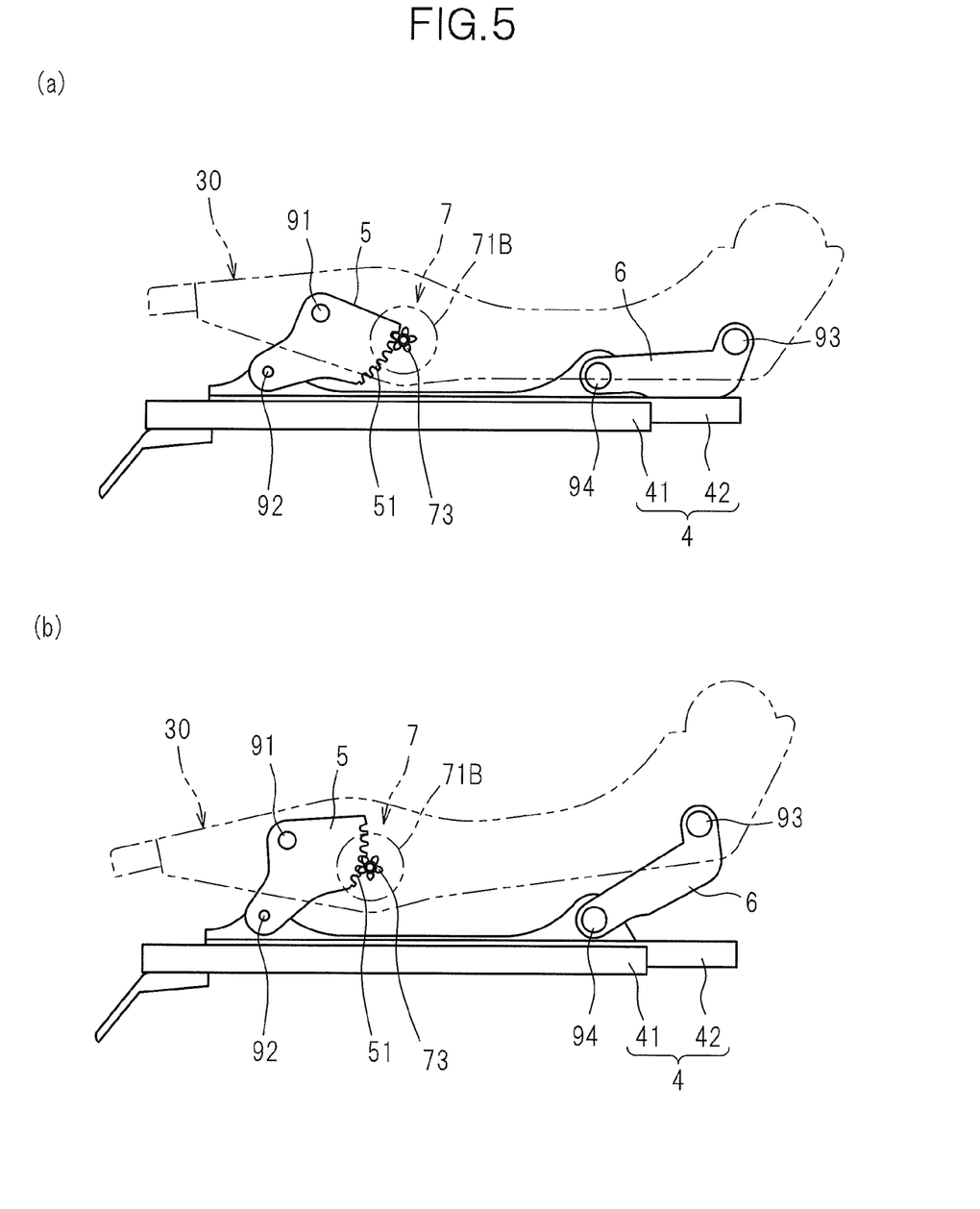
FIG. 5 is an explanatory diagram of height adjustment, in which (a) shows a state in which the seat bottom is lowered and (b) shows a state in which the seat bottom is lifted.

When the operation knob 71B is operated from the state shown in FIG. 5 (*a*) to turn clockwise in the drawing, the left and right pinion gears 73 (only one of which is illustrated) connected by the connecting member 74 rotate clockwise in the drawing, and the sector gear portions 51 of the front links 5 in mesh therewith are caused to rotate counterclockwise in the drawing about the pin 91. Accordingly, the left and right front links 5 are raised frontward.

Interlocked with this, the rear links 6 which constitute the four-bar linkages with the front links 5, slide rails 4 and the side frames 30 are also raised frontward; thus, the side frames 30 are moved upward as shown in FIG. 5 (*b*). As a result, the seat bottom can be moved in a higher position.

On the other hand, when the operation knob 71B is operated from the state shown in FIG. 5 (*b*) to turn counterclockwise in the drawing, the left and right pinion gears 73 are caused to rotate counterclockwise in the drawing, and the sector gear portions 51 of the front links 5 in mesh therewith is caused to rotate clockwise in the drawing about the pin 91. Accordingly, the front links 5 and the rear links 6 are tilted rearward; thus, the side frames 30 are moved downward, as shown in FIG. 5 (*a*). As a result, the seat bottom can be moved in a lower position.

With the above-described configuration, according to the present embodiment, the following advantages can be achieved.

Since the front links 5 in the present embodiment include the sector gear portions 51 configured such that the rotation of the operation knob 71B (i.e., pinion gear 73) causes the front links 5 to pivot, a sector gear as a discrete part as provided in the conventional configuration can be omitted, so the number of parts can be reduced.

Moreover, since the rotational motion of the operation knob 71B directly causes the front links 5 to pivot in a raise-up direction of in a tilt-down direction, and thus actuates the four-bar linkage for adjustment of the height of the seat bottom, a member connecting the front and rear links 5, 6 can be omitted, so that the number of parts can be reduced.

As the number of parts can be reduced as described above, the reduction of cost can be achieved in comparison with the conventional seat; to be more specific, the costs for manufacturing, or the like can be achieved thanks to the reduction of the number of parts and the reduction of labor during assembly. Furthermore, the thus-achieved reduction of number of parts leads to the reduction of the total weight of the car seat 1.

Since the operation unit 7 in the present embodiment includes a pair of left and right pinion gears 73 and a connecting member 74 configured to connect the pair of pinion gears 73 to render the pinion gears 73 rotatable together, the left and right front links 5 can be caused to pivot simultaneously in the raise-up direction or in the tilt-down direction by turning the operation knob 71B. With this configuration, the heights of the left and right side frames 30 can be adjusted simultaneously, and thus twisting of the left and right side frames 30 can be avoided, so that the adjustments of the heights of the seat bottom can be made stably.

Moreover, since after adjustment of the height of the seat bottom has been accomplished, the pivoting motion of the left and right front links 5 is restricted (locked) by the engagement of each sector gear portion 51 and the pinion gear 73 having a friction therewith, the left and right side frames 30 are supported by the respective front links 5 at both of the left and right sides. With this configuration, twisting of the side frames 30 which could be caused if one side frame 30 is positioned lower than the other side frame 30, or otherwise, can be prevented, so that the position in the height of the seat bottom can be stabilized.

Since the region in which the pinion gear 73 and the sector gear portion 51 engage with each other, in the present embodiment, is located adjacent to the gear support wall 33 and covered with the gear support wall 33 when viewed from the lateral direction, the gears can be prevented from getting disengaged. Moreover, since the gear support wall 33 is provided in the side frames 30, the need for providing another member for preventing the gears from getting disengaged can be obviated, and thus the number of parts can be reduced, so that the costs and the weight of the seat can be reduced.

Although the embodiment of the present invention has been described above, the present invention is not limited to the above-described embodiment. Specific configurations may be modified, where appropriate, without departing from the gist of the present invention.

In the above-described embodiment, the slide rail 4 configured to render the seat bottom movable in the front-rear direction is illustrated as a link support member, but the present invention is not limited to this configuration. For example, the link support member may be embodied by hardware for supporting the links fixed to the floor of the vehicle, or by a floor of the vehicle in which a portion for supporting the links is formed.

In the above-described embodiment, the upper-end portions of the front links 5 and the rear links 6 are connected to the inside of the side frames 30, but the present invention is not limited to this configuration; for example, at least one of each front link and each rear link may be connected to an outside of the side frame. In this embodiment, the output gear configured to engage with the input gear provided at the front link may be disposed at an outside of the side frame.

In the above-described embodiment, the operation knob 71B is provided at the left side frame 30, but the present invention is not limited to this arrangement, and may be provided at the right side frame 30.

In the above-described embodiment, the gear support wall 33 is formed to cover the region in which the pinion gear 73 (output gear) and the sector gear portion 51 (input gear) engage with each other, but the present invention is not limited to this configuration; for example, a gear support wall may not cover the region in which the output gear and the input gear engage with each other.

In the above-described embodiment, the sector gear portion 51 (input gear) is formed at each of the left and right front links 5, but the present invention is not limited to this configuration, and the input gear may be formed at one of the left and right front links. In this configuration, the output gear provided only at the side at which the input gear is formed may suffice, and the connecting member may be omitted.

In the above-described embodiment, a seat for a car such as an automobile is illustrated by way of example as an application of a vehicle seat, but the present invention is not limited to this application, and can also be applied to any other type of vehicle seat, for example, a seat for a ship or for an aircraft.

The invention claimed is:

1. A vehicle seat with a height adjustable seat bottom, comprising:

a pair of side frames which constitutes left and right frames of the seat bottom;

a link support member disposed under the pair of side frames;

left and right rear links having upper-end portions pivotally connected to rear portions of the side frames, respectively, and lower-end portions pivotally connected to rear portions of the link support member, respectively;

left and right front links disposed frontwardly of the rear links, the left and right front links having upper-end portions pivotally connected to front portions of the side frames, respectively, and lower-end portions pivotally connected to front portions of the link support member, respectively; and an operation unit including an operation member configured to be operated to make a rotational motion which actuates a four-bar linkage formed with the side frames, the link support member, the rear links and the front links, configured for adjustment of a height of the seat bottom, wherein the operation unit includes an output gear configured to be rotatable coaxially with the operation member provided at one of the pair of side frames, wherein the front links include an input gear configured to engage with the output gear, such that rotation of the output gear causes the front links to pivot, wherein the output gear is disposed rearwardly of a pin by which an upper-end portion of each front link is pivotally connected to a corresponding side frame, and wherein the input gear is formed along a rear side of at least one of the front links.

2. The vehicle seat according to claim 1, wherein each of the left and right front links includes the input gear, and wherein the operation unit includes a pair of left and right output gears each configured to engage with the input gear, and a connecting member elongated in a lateral direction and configured to connect the pair of output gears to render the output gears rotatable together.

3. The vehicle seat according to claim 2, wherein the side frames include link support walls configured to support the front links in a manner that renders the front links pivotable, and gear support walls each provided in a position shifted laterally from a corresponding link support wall and configured to support the output gears in a manner that renders the output gears rotatable, and wherein a region in which each output gear and the corresponding input gear engage with each other is located adjacent to the corresponding gear support wall and covered with the corresponding gear support wall when viewed from a lateral direction.

4. The vehicle seat according to claim 1, wherein the side frames include link support walls configured to support the front links in a manner that renders the front links pivotable, and a gear support wall provided in a position shifted laterally from the link support wall and configured to support the output gear in a manner that renders the output gear rotatable, and wherein a region in which the output gear and the input gear engage with each other is located adjacent to the gear support wall and covered with the gear support wall when viewed from a lateral direction.

* * * * *